(12) United States Patent
Ion

(10) Patent No.: US 7,865,992 B1
(45) Date of Patent: Jan. 11, 2011

(54) DOCK LEVELER FOR LOADING DOCK WITH AIR BAG ACTUATOR

(75) Inventor: Gregory Ion, Richmond Hill (CA)

(73) Assignee: Blue Giant Equipment Corporation, Brampton (CA)

( * ) Notice: Subject to any disclaimer, the term of this patent is extended or adjusted under 35 U.S.C. 154(b) by 0 days.

(21) Appl. No.: 12/764,504

(22) Filed: Apr. 21, 2010

(51) Int. Cl.
*E01D 1/00* (2006.01)
(52) U.S. Cl. ............................................ 14/71.3
(58) Field of Classification Search ................ 14/71.3
See application file for complete search history.

(56) References Cited

U.S. PATENT DOCUMENTS

| | | | |
|---|---|---|---|
| 2,689,965 A | 9/1954 | Fenton | 14/71.7 |
| 3,379,411 A | 4/1968 | Vanderjagt | 254/93 R |
| 5,481,774 A | 1/1996 | Hodges et al. | 14/71.7 |
| 5,600,859 A | 2/1997 | Hodges et al. | 14/71.1 |
| 5,802,650 A | 9/1998 | Massey et al. | 14/71.3 |
| 6,061,859 A | 5/2000 | Winter | 14/71.3 |
| 6,360,393 B1 | 3/2002 | Fritz | 14/69.5 |
| 6,460,212 B2 | 10/2002 | Massey et al. | 14/71.3 |
| 6,643,880 B1 | 11/2003 | Massey et al. | 14/71.3 |
| 7,503,089 B2 | 3/2009 | Muhl et al. | 14/69.5 |

*Primary Examiner*—Gary S Hartmann
(74) *Attorney, Agent, or Firm*—Ogilvy Renault LLP; Paul J. Field

(57) ABSTRACT

A loading dock leveler having: a base with an inward end; a deck with a top platform, the deck having an inward end hingedly mounted to the inward end of the base for movement between an upper position and a lower position; a bellows assembly spaced a distance below the deck, the bellows assembly including an inflatable air bag with a bottom surface engaging the base and a top surface engaging a lever arm hingedly mounted to the base, the lever arm and air bag moving between an inflated position and a deflated position, the air bag having an internal chamber in communication with a source of pressurized air and an air vent; a support strut having an upper end engaging the deck and a lower end engaging the base, the support strut being moveable with the deck between: the lower position; and the upper position wherein the support strut supports the deck, and; a mechanical motion transfer device engaging the lever arm of the bellows assembly and engaging the base, the motion transfer device transferring relative motion between the base and the lever arm to the support strut, wherein the motion of the lever arm from the deflated to the inflated position moves the support strut from one of: the lower position to the upper position; and the upper position to the lower position.

14 Claims, 5 Drawing Sheets

DOCK LEVELER FOR LOADING DOCK WITH AIR BAG ACTUATOR

TECHNICAL FIELD

The invention relates to a dock leveler with a movable deck using an air bag actuator to move between a downward and an upward inclination.

BACKGROUND OF THE ART

Loading dock levelers are commonly used for providing an inclined ramp or a level bridge between the surface of a transport truck deck and the floor surface of a loading dock of a building thereby facilitating the loading and unloading of the truck by wheeled vehicles, as well as pedestrian or animal traffic if necessary.

Transport trucks have load carrying decks that vary in height above the pavement depending on the size of truck, the intended use of the truck and the state of compression that the truck suspension is in when loaded or unloaded. Since any truck arriving at a dock may have a deck within a range of heights and the height can float with the suspension under loading, the loading dock leveler must be able to move vertically and the outside end often pivots from a fixed pivot point on the building to rest on the top surface of the truck deck.

The movable deck of the dock leveler usually has a main deck that pivots from the building and an outside lip plate that is thin and of relatively short length that pivots on the outside end of the main deck to provide a smooth transition between the truck deck surface and the main deck. The main deck is a larger thicker structure that provides a long ramp or bridge section to accommodate most of the difference in heights between the truck deck and building floor while the lip plate can be a relatively thin plate that rests upon the truck deck and provides a short ramp transitioning between the truck deck and the dock leveler main deck platform.

Actuators for moving the deck of the dock leveler can include inflatable air bags, hydraulic or pneumatic cylinders, mechanical linkages, cable hoist devices or electric motor driven screw actuators.

In many environments the use of hydraulic oil is not acceptable due to the risk of contamination by oil leaks, health or other safety concerns. For example in food or drug processing, handling or distribution facilities the use of pressurized air actuators are chosen eliminate the risk of contaminating these consumable products with leaked oil.

Further, when loading docks are fitted with load levelers in hospitals, schools, or shopping malls use of air actuators may be preferred for improved hygiene and appearance. Since loading docks are often critical to the operation of a facility with timely movement of supplies and perishable products passing over the dock, any design feature that can simplify maintenance and speed up repairs is highly desirable.

The present invention includes a load leveler mechanism having an air power actuator and also including operating elements that improve performance, simplify manufacturing and maintenance.

Features that distinguish the present invention from the background art will be apparent from review of the disclosure, drawings and description of the invention presented below.

DISCLOSURE OF THE INVENTION

The invention provides a loading dock leveler having: a base with an inward end; a deck with a top platform, the deck having an inward end hingedly mounted to the inward end of the base for movement between an upper position and a lower position; a bellows assembly spaced a distance below the deck, the bellows assembly including an inflatable air bag with a bottom surface engaging the base and a top surface engaging a lever arm hingedly mounted to the base, the lever arm and air bag moving between an inflated position and a deflated position, the air bag having an internal chamber in communication with a source of pressurized air and an air vent; a support strut having an upper end engaging the deck and a lower end engaging the base, the support strut being moveable with the deck between: the lower position; and the upper position wherein the support strut supports the deck, and; a mechanical motion transfer device engaging the lever arm of the bellows assembly and engaging the base, the motion transfer device transferring relative motion between the base and the lever arm to the support strut, wherein the motion of the lever arm from the deflated to the inflated position moves the support strut from one of: the lower position to the upper position; and the upper position to the lower position.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
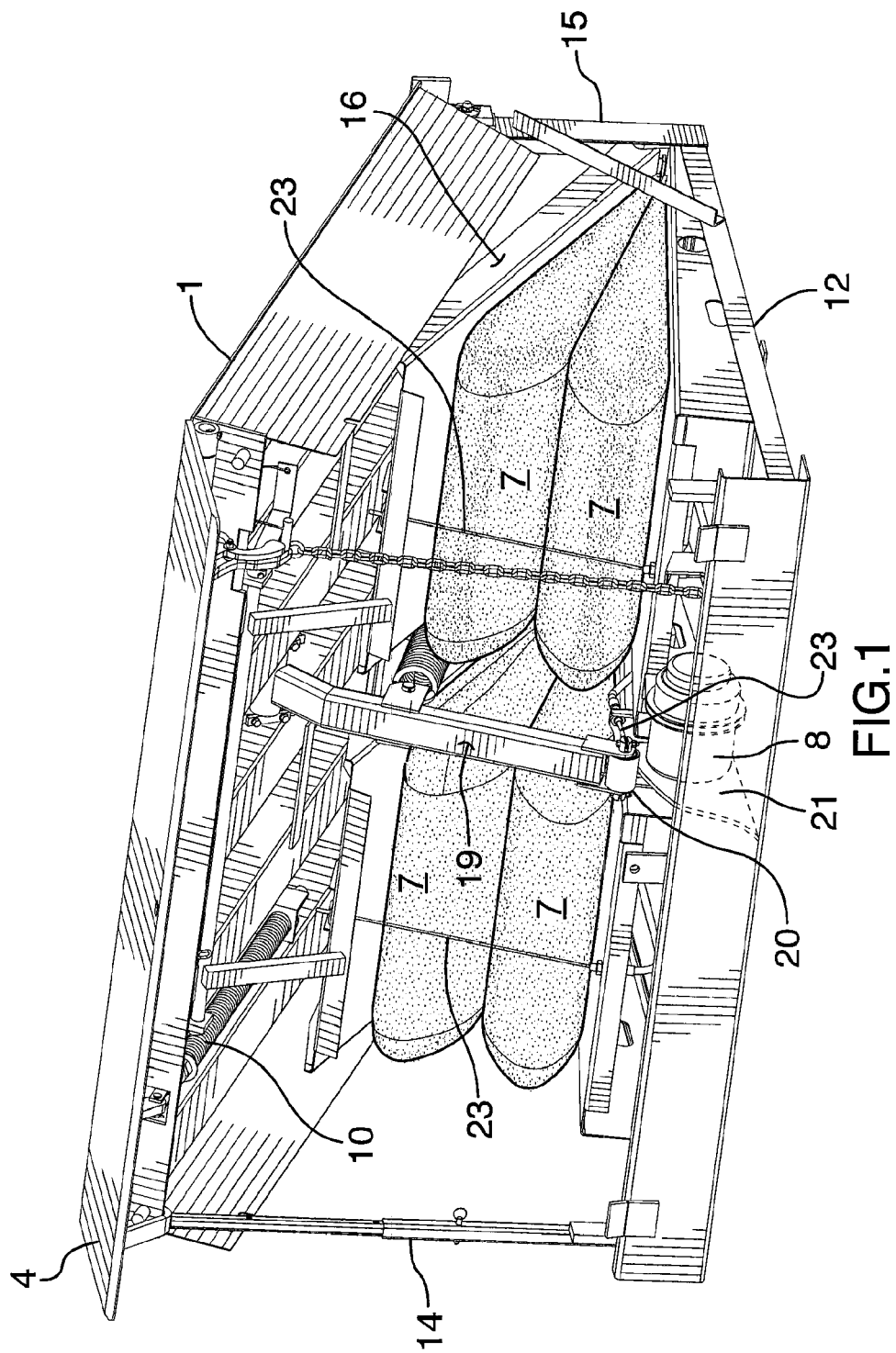
FIG. 1 is a front isometric view of a loading dock leveler with the deck in the upper position and the four inflatable bags of the bellows assembly in the inflated position.
Figure 2:
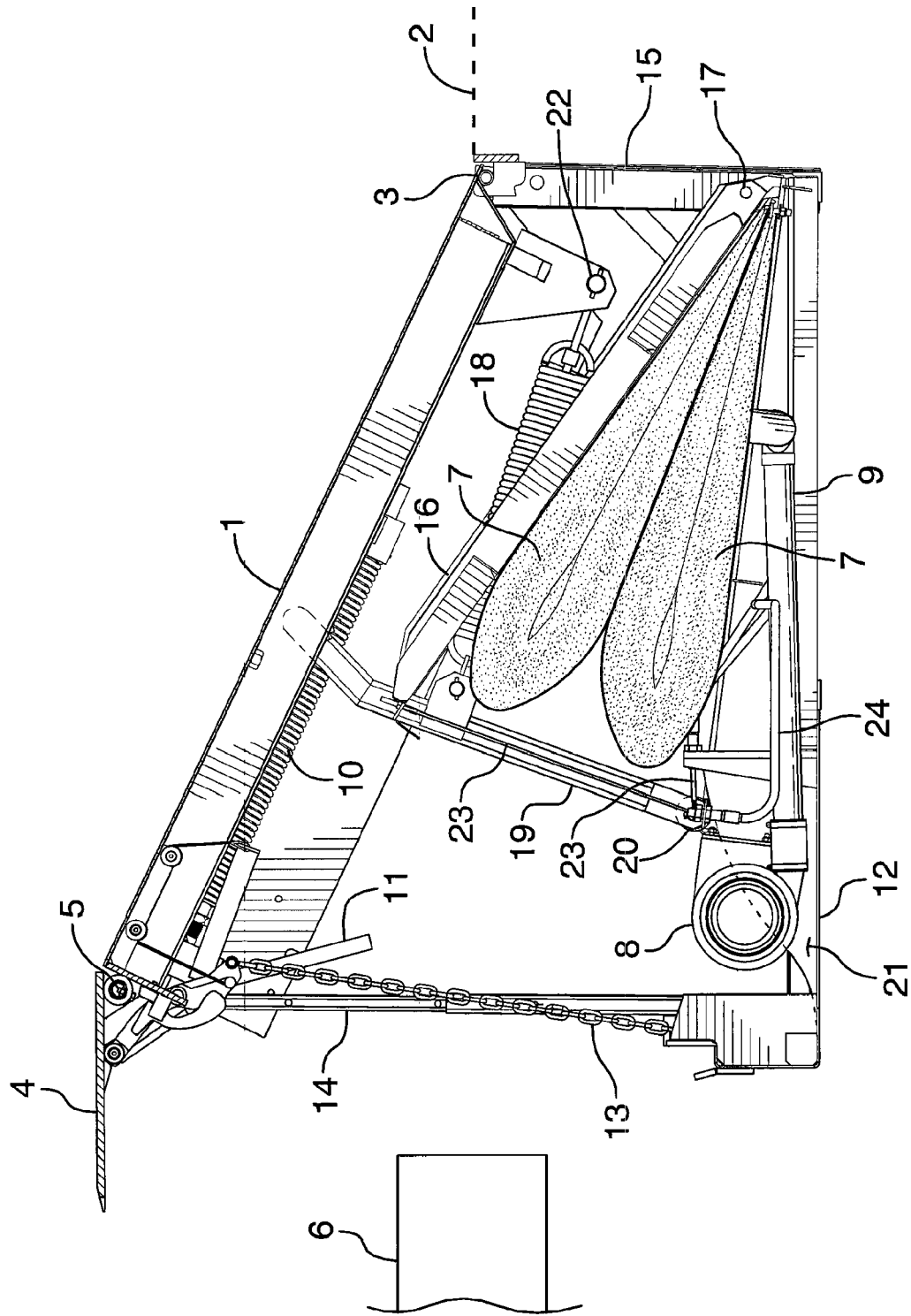
FIG. 2 is a left side view of the loading dock leveler of FIG. 1 in the inflated position.
Figure 3:
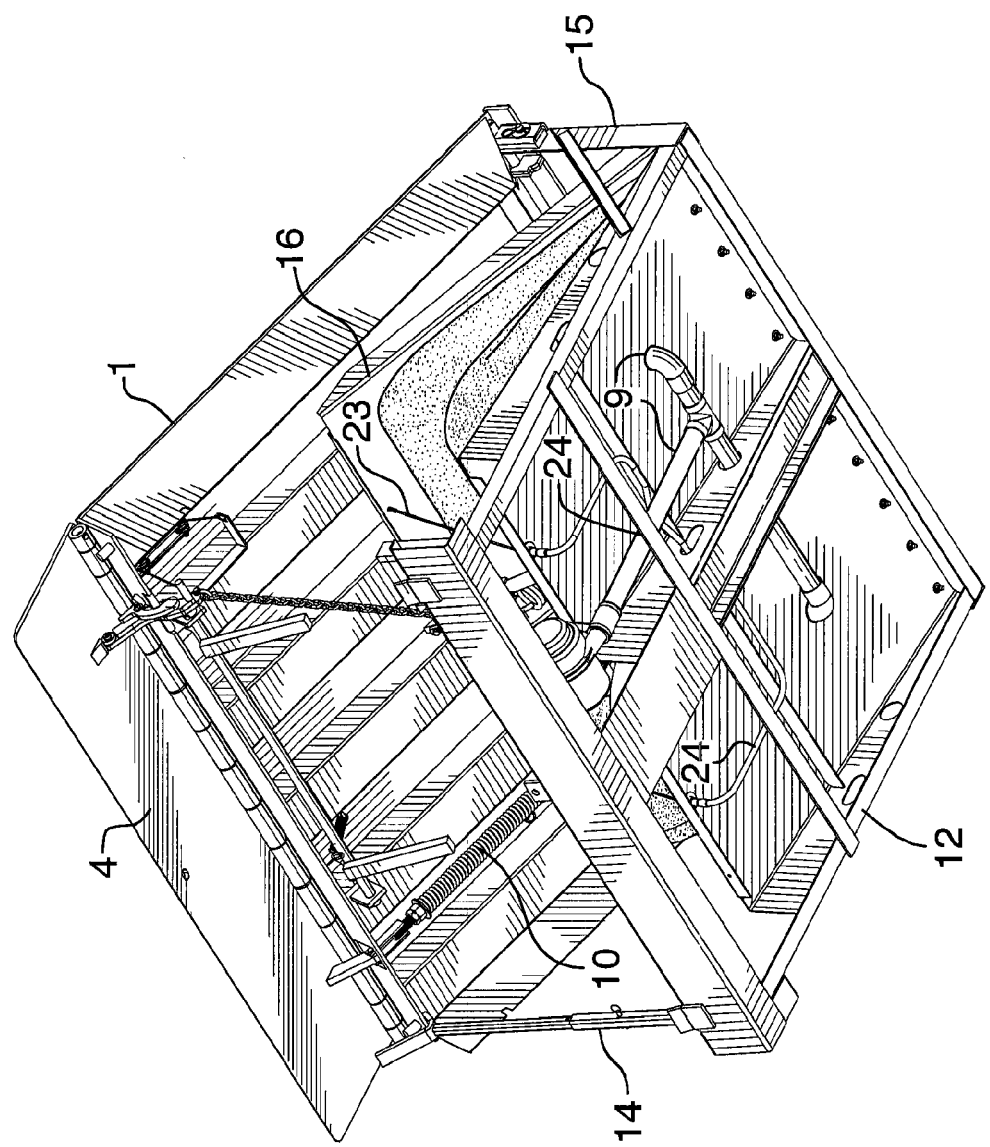
FIG. 3 is a bottom isometric view of the loading dock leveler of FIG. 1 in the inflated position.
Figure 4:
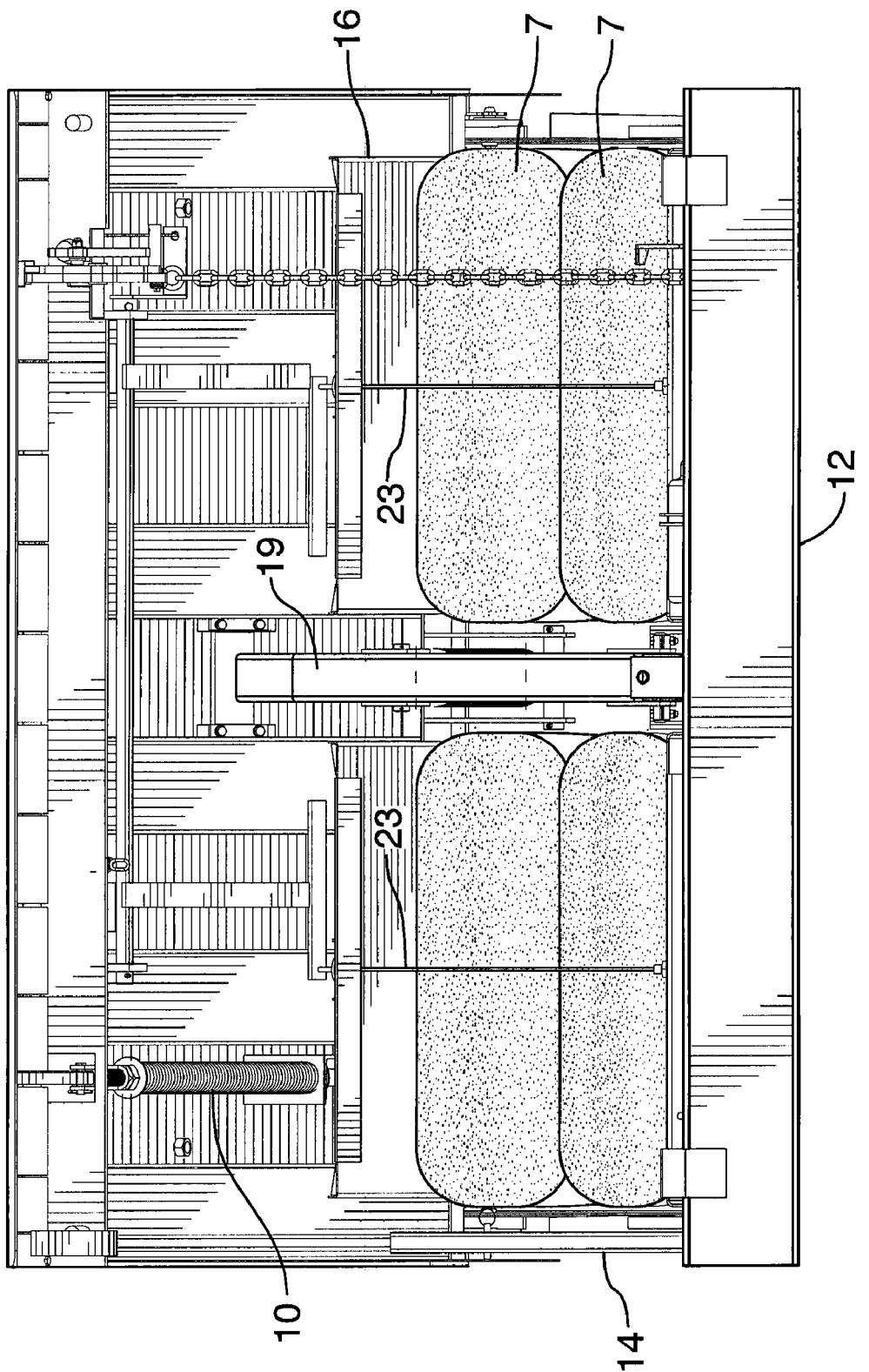
FIG. 4 is a front view of the loading dock leveler of FIG. 1 in the inflated position.

FIGS. 1-2 show the loading dock leveler which is generally rectangular and fits within a rectangular threshold recess adjacent a truck loading doorway in a building, or in the edge of a raised dock platform. The dock platform, and floor of the building are at the level of the rear of the dock leveler. The building and doorway are not shown since such arrangements are commonly known to those skilled in the art.

FIG. 2 shows the movable deck 1 of the dock leveler with a main deck with a top platform surface on which wheeled vehicles, people or animals travel. The deck 1 pivots relative to the building floor 2 about a hinge pin 3.

An outside lip plate 4 is relatively thin and of relatively short length to pivot on a pin 5 on the outside end of the main deck 1 and when lowered the lip plate 4 provides a smooth transition between the truck deck surface 6 and adjacent main deck 1. A bellows assembly includes four inflatable air bags 7 as pneumatic actuators for moving the deck 1 of the dock leveler between the upper position shown in FIGS. 1-4 and the lower position shown in FIG. 5.

FIGS. 1-4 show the loading dock leveler with deck 1 in its uppermost position and the air bags 7 fully inflated. After a truck with its deck 6 is backed up to the dock and secured, the air bags 7 are inflated using the air blower 8 and pipes 9 to move the deck 1 from the lower position in FIG. 5 to the upper position in FIGS. 1-4.

The lip plate 4 under the biasing force of the lip spring 10 rotates about the pin 5 to an extended position shown in FIG. 2. The air bags 7 are then deflated and the lip plate 4 and deck 1 rotate downwardly until the truck deck 6 is engaged. When moving to the lowered position of FIG. 5, mechanical linkages and legs 11 serve to retract the lip plate 4 when the legs 11 slide on the base 12. These linkages, actuating chain 13 and manually removable safety prop arm 14 need not be explained in detail since they are common to the art.

The base 12 has an inward end 15 to which the inward end of the deck 1 is hingedly mounted on hinge pin 3 for movement between the extreme upper position (FIGS. 1-4), the extreme lower position (FIG. 5), and all intermediate positions as well.

As best seen in FIG. 2 the bellows assembly with air bags 7 is spaced a distance below the deck 1. When the deck 1 is propped open with the safety prop arm 14, the bags 7 can be deflated and maintenance can be performed on the bellows assembly, the blower 8 and other mechanical elements independently of the deck 1.

The bellows assembly illustrated has four air bags 7 arranged in two laterally adjacent bellows each having two air bags 7 and an independently operable lever arm 16. It will be understood that the invention is not limited to the embodiment illustrated but may include one air bag 7 only, or any number of air bags 7. As illustrated the lower of the stacked inflatable air bags 7 has a bottom surface engaging the base 2. A top surface of the upper of the stacked inflatable air bags 7 engages an lever arm 16 hingedly mounted to the base 2 with pins 17.

The lever arm 16, is shown as a flat plate which together with the air bags 7 move between the inflated position and the deflated position when the blower 8 serves as a source of pressurized air and an air vent to communicate with an internal chamber of the bags 7. By powering the blower 8 the bags 7 are inflated and by disengaging power from the blower 8 the bags 7 deflate under the weight of the deck 1 which is slowed in its downward descent by the counterweight spring 18 going into tension.

A support strut 19 has an upper end engaging the deck 1 as illustrated with a pivot joint. A lower end of the support strut 19 has a roller 20 engages a roller runway on the base 12. The drawings show a vertically oriented plate 21 with an S-shaped double curvature cam surface on which the roller 20 rolls to control the motion of the lower end of the strut 19 and consequently the position of the deck 1.

Figure 5:
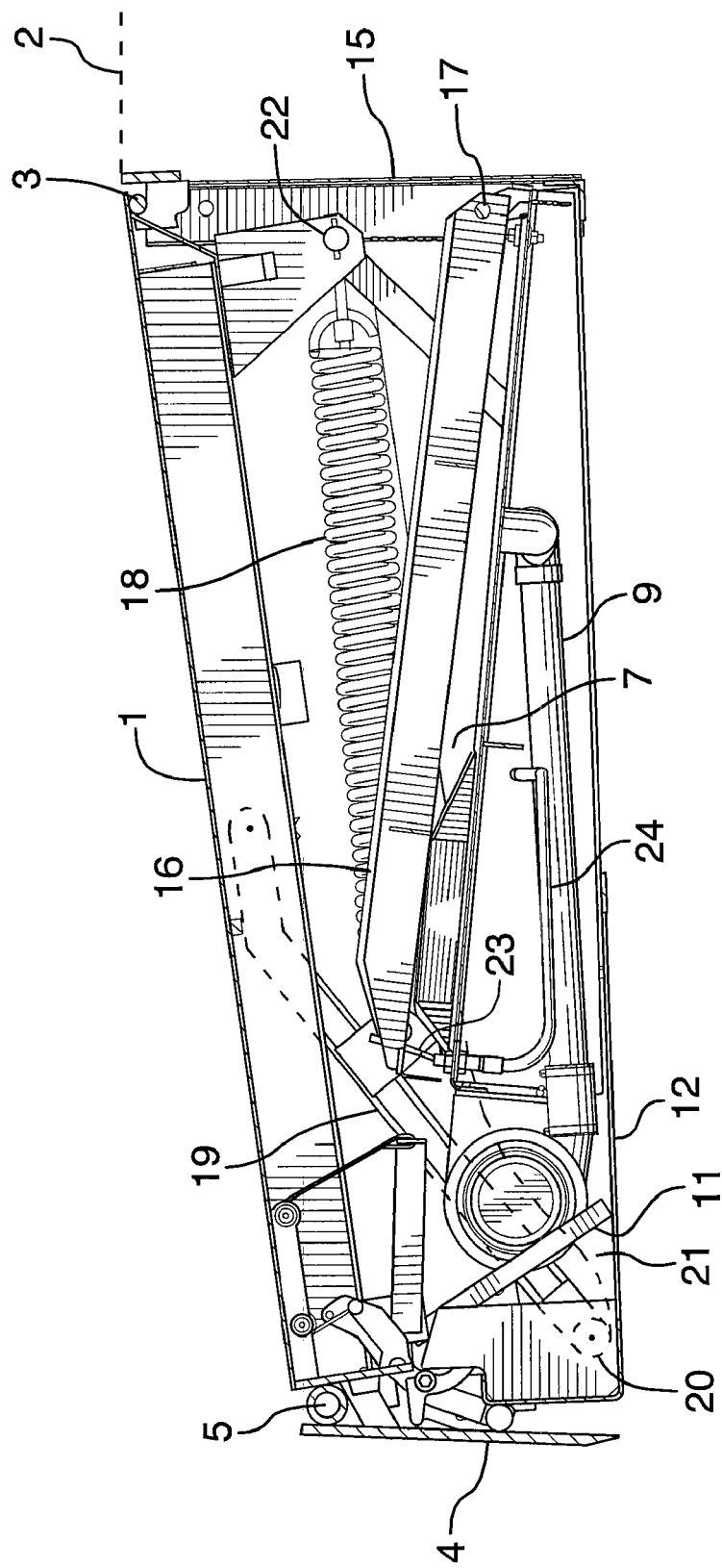
FIG. 5 is a left side view of the loading dock leveler of FIG. 2 in the deflated and lower position.

The support strut 19 supports the deck 1 and is moveable with the deck 1 between the lower position of FIG. 5 and the upper position of FIG. 2 where the motion is controlled by the engagement between the roller 20 and the S-shaped cam surface of the vertical plate 21. The S-shape provides a slower start and end portion of the movement and a steeper slope in the middle portion increases the speed of movement. The support strut 19 has one end of the counterweight spring 18 extending from an intermediate portion of the strut 19 between the upper and the lower ends, and the other end of the counterweight spring 18 is fixed to the deck 1 at pin 22 but may alternatively be attached to the base 12.

A mechanical motion transfer device engages the lever arm 16 of the bellows assembly and engages the base 12 so that the relative motion between the base 12 and the lever arm 16 are transferred to the lower end of the strut 19 adjacent the roller 20.

As illustrated the mechanical motion transfer device can be formed as a cable 23 slidably housed in a sleeve 24 where the cable 23 has a first end secured to the lever arm 16 and a second end secured to the support strut 19 adjacent the roller 20. The sleeve 24 ends are fixed and the sliding cable 23 moves the lower end of the strut 19 and roller as the lever arm 16 moves when the air bags 7 are inflated and deflated. So the motion of the lever arm 16 from the deflated to the inflated position moves the support strut 19 from one of: the lower position to the upper position; and the upper position to the lower position depending on the arrangement of the cables 23.

The illustrated embodiment shows two cables 23 which gives some reserve capacity and mechanical redundancy to improve reliability. Other mechanical motion transfer devices may include a scissor mechanism or mechanical linkages as alternatives.

Although the above description relates to a specific preferred embodiment as presently contemplated by the inventor, it will be understood that the invention in its broad aspect includes mechanical and functional equivalents of the elements described herein.

The invention claimed is:

1. A loading dock leveler comprising:
  a base having an inward end;
  a deck with a top platform, the deck having an inward end hingedly mounted to the inward end of the base for movement between an upper position and a lower position;
  a bellows assembly spaced a distance below the deck, the bellows assembly including an inflatable air bag with a bottom surface engaging the base and a top surface engaging a lever arm hingedly mounted to the base, the lever arm and air bag moving between an inflated position and a deflated position, the air bag having an internal chamber in communication with a source of pressurized air and an air vent;
  a support strut having an upper end engaging the deck and a lower end engaging the base, the support strut being moveable with the deck between: the lower position; and the upper position wherein the support strut supports the deck, and;
  a mechanical motion transfer device engaging the lever arm of the bellows assembly and engaging the base, the motion transfer device transferring relative motion between the base and the lever arm to the support strut, wherein the motion of the lever arm from the deflated to the inflated position moves the support strut from one of: the lower position to the upper position; and the upper position to the lower position.

2. The loading dock leveler according to claim 1, wherein the mechanical motion transfer device comprises a cable having a first end secured to the lever arm and a second end secured to the support strut.

3. The loading dock leveler according to claim 2, wherein the mechanical motion transfer device comprises an outer sleeve within which the cable is slidably housed.

4. The loading dock leveler according to claim 1, wherein the upper end of the support strut is pivotally mounted to the deck; and the lower end of the support strut has a roller engaging a roller runway on the base.

5. The loading dock leveler according to claim 4, wherein the roller runway comprises a vertically curved cam surface.

6. The loading dock leveler according to claim 5, wherein the vertically curved cam surface has an S-shaped double curvature.

7. The loading dock leveler according to claim 1, wherein the lower end of the support strut is pivotally mounted to the base; and the upper end of the support strut has a roller engaging a roller runway on the deck.

8. The loading dock leveler according to claim 7, wherein the roller runway comprises a vertically curved cam surface.

9. The loading dock leveler according to claim 8, wherein the vertically curved cam surface has an S-shaped double curvature.

10. The loading dock leveler according to claim 1, wherein the support strut includes a counterweight spring extending from an intermediate portion of the strut between the upper and the lower ends, and one of: the deck; and the base.

11. The loading dock leveler according to claim 1, wherein the source of pressurized air comprises an air blower.

12. The loading dock leveler according to claim 11, wherein the blower communicates with the air bag through a pipe.

13. The loading dock leveler according to claim 1 wherein the bellows assembly comprises two vertically stacked air bags.

14. The loading dock leveler according to claim 1 wherein the bellows assembly comprises two laterally adjacent bellows each having an independently operable lever arm.

* * * * *